Figure 2:
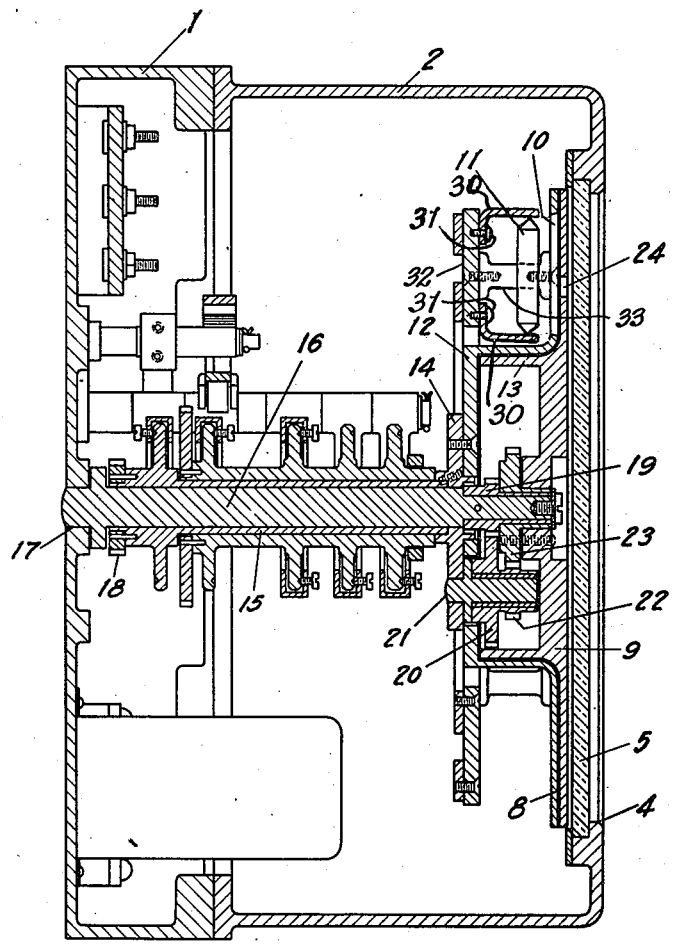

July 30, 1935.  E. HEDLEY  2,009,449
INDICATING INSTRUMENT
Filed Nov. 16, 1931  3 Sheets-Sheet 1
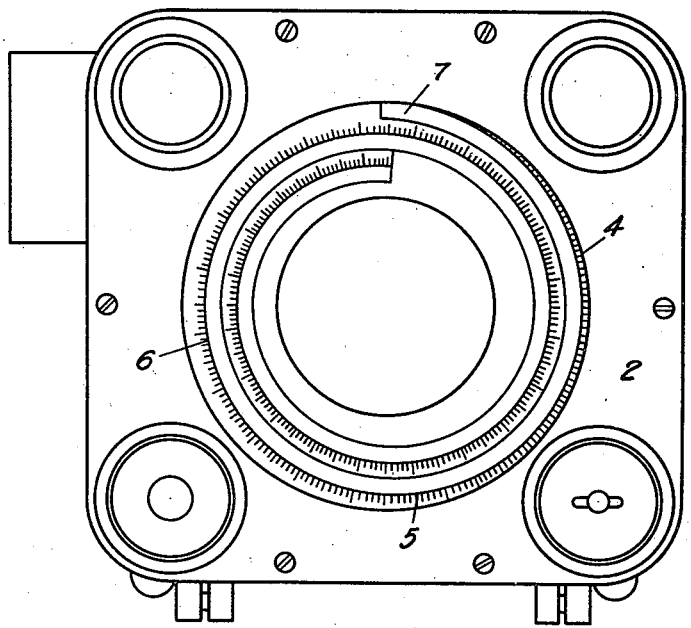
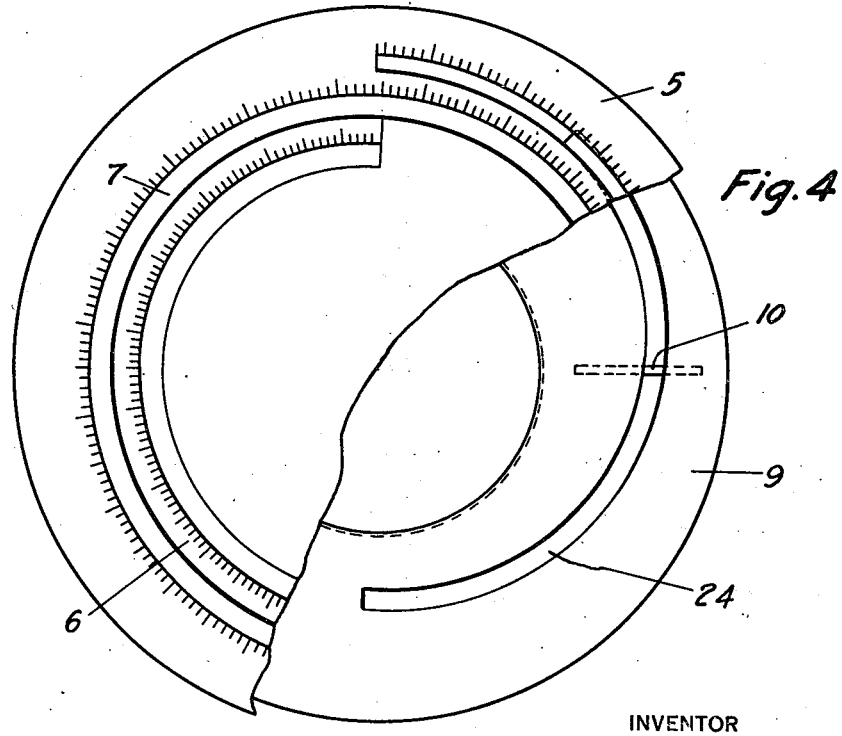
INVENTOR
Elias Hedley
BY
ATTORNEY

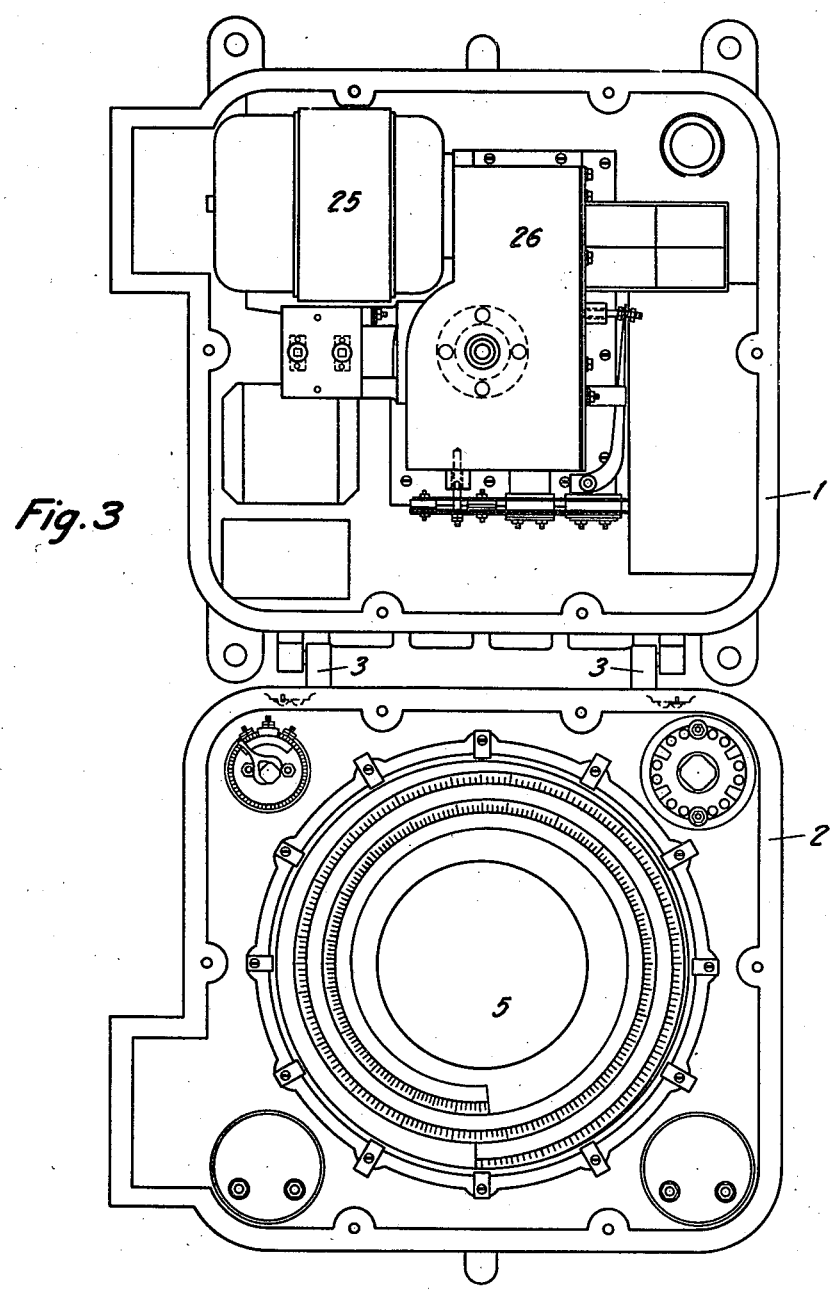

Patented July 30, 1935

2,009,449

UNITED STATES PATENT OFFICE 2,009,449

INDICATING INSTRUMENT

Elias Hedley, Whitechapel, London, England, assignor to Submarine Signal Company, Boston, Mass., a corporation of Maine Application November 16, 1931, Serial No. 575,356
In Great Britain January 13, 1931

6 Claims. (Cl. 116—129)

The present invention relates to means for facilitating the reading of scales of instruments of the type having a rotating pointer or its equivalent and wherein the scale is of such a length, having regard to the available diameter of dial, that it is necessary to mark the graduations on a spiral line having more than one convolution. In such a case the pointer or the like necessarily subtends all the convolutions of the spiral scale and some auxiliary means is required to indicate on which convolution a given reading is to be taken. It is the object of the present invention to provide means for determining the convolution for the time being to be employed. The invention has been evolved in connection with and is particularly applicable to instruments for measuring depths or distances by means of an indication of the time taken for a sound to travel to the desired depth or distance and an echo to be received back, but it is not to be regarded as necessarily confined in its application to such instruments.

According to the invention, there is associated with the spiral scale a disc having a slot which functions, on rotation of the disc at a definite speed relatively to that of the pointer or the like, to permit the taking of a reading only on that convolution of the scale which for the time being is appropriate.

One form of depth or distance finding apparatus of the type above mentioned is described, for example, in United States Patent No. 1,667,540. In this patent a circular scale is marked on a circular glass plate behind which there is an opaque rotatable disc having a radial slot behind which is a neon tube or like indicator. The instrument is so designed that on the emission of a sound signal by means of an oscillator, or other sound producer, the slot in the rotatable disc is passing the zero mark on the scale. On receipt of the echo the neon tube is caused to glow momentarily, thus causing a flash of light to appear at the slot, thereby indicating the momentary position of the indicator. It is possible now to substitute a spiral scale in place of the circular scale and to make the radial neon tube long enough to subtend all of the convolutions of the spiral scale. However, if this is done, it is possible to take the reading of the position of the neon tube when it is caused to glow upon receipt of the echo on any of the convolutions of the spiral scale. Some auxiliary means is, therefore, necessary to determine on which of the convolutions the reading should be taken and such means is provided in accordance with the present invention.

In order that the said invention may be clearly understood and readily carried into effect, the same will now be described more fully with reference to the accompanying drawings, in which:—

Figure 1 is a front elevation illustrating the application of the invention to an instrument for indicating depth, Figure 2 is a vertical section of same to an enlarged scale, Figure 3 is a view illustrating the instrument opened to show the internal mechanism, Figure 4 is a view illustrating the discs and scale removed from the instrument some of the parts being broken away for clearness.

In the construction illustrated by the accompanying drawings the casing of the instrument is formed in two parts 1 and 2, the two parts being hingedly connected together at 3 so that the front half 2 can be turned down into the position shown in Figure 3 for access to the internal mechanism. The front part 2 of the casing has a circular opening 4 in which is mounted a glass plate 5 carrying a spiral scale 6 having two complete convolutions. The scale 6 may be applied to the glass in any suitable manner and may be of a translucent or transparent nature a part 7 adjacent the scale being preferably left clear. The scale is calibrated to suit the particular purpose for which the instrument is to be used, the scale in the particular instrument described reading from 0–400 fathoms. Mounted directly behind the glass plate 5 are two discs 8 and 9 the disc 8 which lies farthest away from the glass plate having a radial slot 10 the length of which is just sufficient to subtend all the convolutions of the spiral scale and behind which a neon tube 11 or other illuminating device is adapted to be mounted. The neon tube 11 may be retained in position behind the slot 10 by means of the supporting brackets 30, 30 attached to the ring 32 by means of the screws 31. The ring 32 is held to the disc 8 by means of the supporting posts 33.

The discs 8 and 9 may be conveniently constructed as mouldings and may be formed from an insulating material such as is sold under the registered trade-mark "Bakelite". The disc 8 is dished at 12 for the reception of a rearwardly projecting boss 13 on the disc 9, this disc 8 being mounted upon a flange 14 secured to a sleeve 15 mounted to revolve about a fixed shaft 16 supported at 17 in the part 1 of the casing. The sleeve 15 carries at its rearmost end a toothed pinion 18 by which it is adapted to be rotated. The disc 9 is adapted to be driven by the disc 8 through the medium of a system of planetary gearing disposed within the projecting boss 13, the planetary gearing including a sun wheel 19 secured to the fixed shaft 16 and a number of toothed planet wheels 20 meshing with the sun wheel and rotatably mounted upon trunnions 21 projecting from the flange 14. Each of the planet wheels 20 has a smaller planet wheel 22 rigidly associated therewith which are adapted to engage and drive a further sun wheel 23 rigidly secured to the disc 9. With this arrangement the discs 8 and 9 are driven in the same direction but at different speeds.

The disc 9 is provided with a spiral slot 24 the maximum and minimum radii of which correspond respectively to those of the scale, the slot being of such a width as to subtend a less radial distance than that between adjacent convolutions of the scale.

The result is that a flash of light from the neon tube or the like does not appear on the scale along the whole length of the radial slot 10 in the disc 8 to which the tube is attached, but only over such portion of that slot as for the time being is uncovered by the spiral slot 24 in the disc 9, and it will be seen that, provided the discs travel at different speeds, such uncovered portion will move toward or away from the centre. By rotating the disc 9 at an appropriate speed relatively to that of the disc 8 on which the tube is fitted, the uncovered portion of the radial slot in the latter disc may be made always to coincide with the spiral scale and consequently the flash, when it occurs, only appears against a graduation on the appropriate convolution, no indication being given in respect of the remaining convolution or convolutions.

The discs 8 and 9 are preferably driven at a speed ratio of 4–5 the disc 8 being driven faster than the disc 9. The discs 8 and 9 are adapted to be driven by means of an electric motor 25 mounted within the casing, motion being transmitted from the motor to the pinion 18 by a system of gear wheels within a gear box 26, the arrangement of electric motor and gear box being shown in Figure 3 of the drawings, the discs 8 and 9 having been removed for the sake of clearness. Suitable switching mechanism is provided for connecting the motor to a source of electric supply to cause the discs to rotate, the action of switching on the motor causing the sound producing device to operate the diaphragm automatically, the whole operation of producing the sound and indicating the depth upon the scale calculated by the time taken to receive back the sound echo continuing indefinitely at intervals whilst the instrument is switched on.

Having now described my invention, I claim:

1. In an indicating instrument a member carrying a spiral scale, an indicator arranged across said scale, means for revolving said indicator in a path parallel to said member and means for so limiting the visibility of the indicator that it will appear to travel uniformly from one end of the scale to the other and will designate the point thereon to be noted at any given moment to the exclusion of all other points.

2. In an indicating instrument a spiral scale having more than one convolution, an indicator, means for moving said indicator, said indicator being positioned transversely across the convolutions of the spiral and means for making the indicator visible in only one convolution at a time, said last means also being arranged to cause said indicator to appear to travel around the spiral in a continuous cycle.

3. In an indicating instrument a dial having a spiral scale with a translucent space between the convolutions of the spiral, an indicator positioned transversely across the convolutions of the spiral, means for rotating said indicator behind the spiral and means for making visible only that indicator portion which follows the convolution of the spiral.

4. In an indicating instrument a dial having a spiral scale with a translucent space between the convolutions of the spiral, an indicator positioned transversely across the convolutions of the spiral, means for moving said indicator behind and over the spiral course, a disc between the indicator and the dial having a slot therein making only a part of the indicator visible, and a means for rotating the disc, the first and second mentioned means being arranged to move said indicator and disc at such relative speeds that the indicator appears to travel around the translucent space.

5. In an indicating instrument a dial having a spiral scale with a translucent space between the convolutions of the spiral, an indicator positioned transversely across the convolutions of the spiral, means for moving said indicator behind and over the spiral course, a disc between the indicator and dial having an arcuate slot therein and having a pitch equal to the radial distance between the spiral ends and means for rotating the disc, the first and second mentioned means being arranged to move said indicator and disc at such relative speeds that the indicator appears to travel around the translucent space.

6. In an indicating instrument a dial having a spiral scale with a translucent space between the convolutions of the spiral, an indicator positioned transversely across the convolutions of the spiral, means for moving said indicator behind and over the spiral course, a disc between the indicator and dial having an arcuate slot therein and having a pitch equal to the radial distance between the spiral ends and means for rotating the disc relative to the indicator at such a rate that the indicator travels the length of the slot in the cycle that a portion of it appears to follow the convolution of the spiral.

ELIAS HEDLEY.